United States Patent
Khermosh et al.

(10) Patent No.: US 7,890,840 B2
(45) Date of Patent: Feb. 15, 2011

(54) ENHANCING THE ETHERNET FEC STATE MACHINE TO STRENGTHEN CORRELATOR PERFORMANCE

(75) Inventors: Lior Khermosh, Givatayim (IL); Onn Haran, Even Yehuda (IL)

(73) Assignee: PMC-Sierra Israel Ltd., Herzeliya Pituah (IL)

( * ) Notice: Subject to any disclaimer, the term of this patent is extended or adjusted under 35 U.S.C. 154(b) by 980 days.

(21) Appl. No.: 11/593,585

(22) Filed: Nov. 7, 2006

(65) Prior Publication Data
US 2007/0206709 A1 Sep. 6, 2007

Related U.S. Application Data

(60) Provisional application No. 60/778,404, filed on Mar. 3, 2006.

(51) Int. Cl.
*H03M 13/00* (2006.01)
(52) U.S. Cl. ....................... 714/777; 375/343
(58) Field of Classification Search ............... 714/777; 375/343
See application file for complete search history.

(56) References Cited

U.S. PATENT DOCUMENTS

| | | | | |
|---|---|---|---|---|
| 5,218,562 | A | * | 6/1993 | Basehore et al. ............ 708/422 |
| 5,646,947 | A | * | 7/1997 | Cooper et al. ............... 370/510 |
| 5,953,378 | A | * | 9/1999 | Hotani et al. ............... 375/341 |
| 6,185,717 | B1 | * | 2/2001 | Fukunaga et al. ........... 714/777 |
| 2002/0016161 | A1 | * | 2/2002 | Dellien et al. ............... 455/403 |
| 2002/0071477 | A1 | * | 6/2002 | Orava ........................ 375/132 |
| 2005/0005189 | A1 | | 1/2005 | Khermosh et al. |

OTHER PUBLICATIONS

IEEE Standards 802.3 (2005), clauses 36 and 65.
Shu Lin and Daniel J.Costello, Jr. "Error Control Coding: Fundamentals and Applications," Prentice-Hall Inc. 1983; Chapter 4 and 6.

* cited by examiner

*Primary Examiner*—M. Mujtaba K Chaudry
(74) *Attorney, Agent, or Firm*—Mark M. Friedman

(57) ABSTRACT

The present invention discloses devices and methods for improving data correlation using a multiple-correlation state-machine, the method including the steps of: (a) pre-processing a data frame having a plurality of symbol sets, wherein each symbol set demarks a respective frame field of the frame, to provide a threshold-compared hamming-distance indicator; (b) comparing the threshold-compared hamming-distance indicator with at least one multiple-correlation threshold to provide a threshold-compared multiple-correlation indicator; and (c) combining the threshold-compared hamming-distance indicator and the threshold-compared multiple-correlation indicator to determine a match/no-match comparison indicative of the respective frame field. In some embodiments, the step of combining includes forming a logical-AND of the threshold-compared hamming-distance indicator and the threshold-compared multiple-correlation indicator. Preferably, the method further includes the step of: (d) prior to the step of combining, comparing a BER of the frame to a BER threshold. Also disclosed is a weighted-correlation method for improving data correlation.

23 Claims, 4 Drawing Sheets

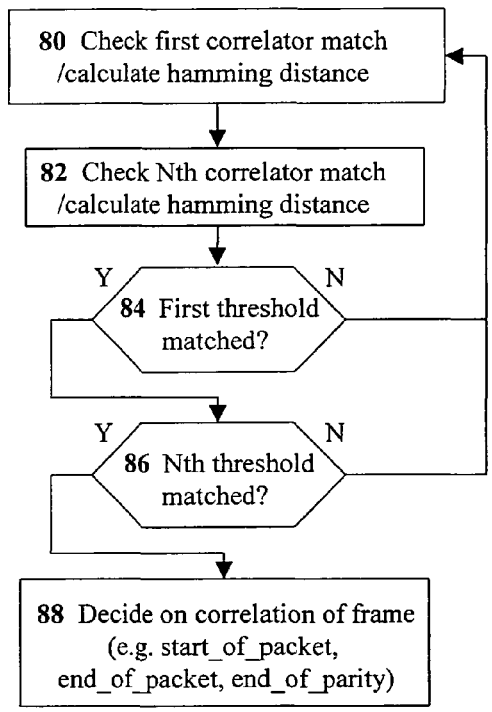 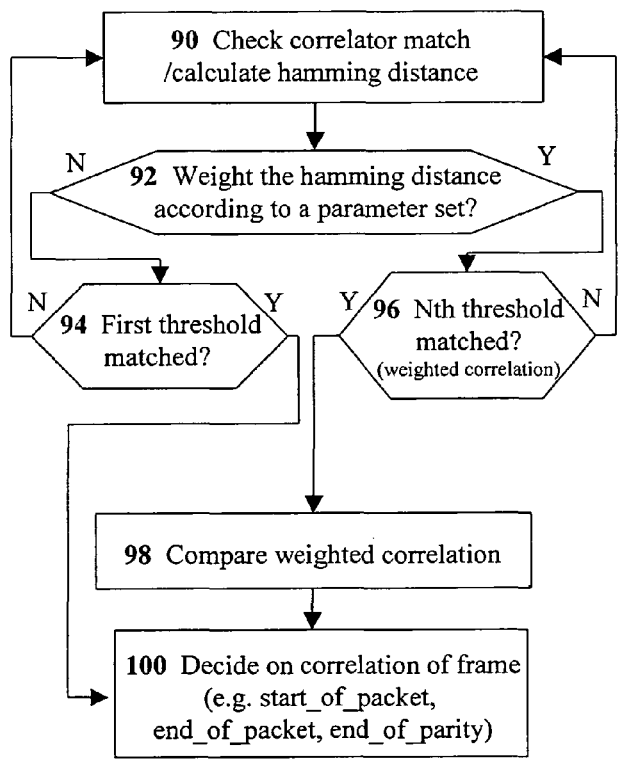
Figure 6                    Figure 7

ENHANCING THE ETHERNET FEC STATE MACHINE TO STRENGTHEN CORRELATOR PERFORMANCE

This patent application claims the benefit of U.S. Provisional Patent Application No. 60/778,404 filed Mar. 3, 2006.

FIELD AND BACKGROUND OF THE INVENTION

The present invention relates to devices and methods for shared-medium data-transmission networks, and particularly, using forward error correction (FEC) coding in Ethernet networks, as specified in the IEEE 802.3, clause 65.

Ethernet technology is one of the most common digital-networking technologies. Specified in the Institute of Electrical and Electronics Engineers (IEEE) standard 802.3, the technology has a large installed base of compatible network devices. (The 2005 edition of the IEEE 802.3 standard is filed together with this document and is hereby incorporated by reference as if fully set forth herein.) Ethernet technology continues to evolve with newer and faster variants, such as the Gigabit Ethernet, which provides network speeds of one gigabit per second.

For several decades, Ethernet technology has been widely used in local-area networks (LANs). More recently, Ethernet technology has been used with increasing frequency in metro-area network (MAN) and other wide-area network (WAN) applications. Such networks include optical networks, such as passive optical networks (PONs). In WAN applications, signal attenuation and budget constraints on the network link have greater importance because of the distances involved for the WAN connectivity, and because of the optical power splitters that may be used along a network link between a transmitter and a receiver.

At some point along the network link, a signal may be attenuated and distorted to such a degree that the information the signal carries cannot be extracted because of: the limited sensitivity of the receiver, noise in the propagation medium, signal source-related noise (such as inter-symbol interference and mode-partition noise), and other sources of noise, attenuation, and distortion. But long before this point is reached, the signal-to-noise ratio (SNR) of the signal deteriorates, and the bit error rate (BER) of the signal increases beyond the tolerable level for a typical application.

Forward Error Correction (FEC) is one method for improving the BER of a received signal with low SNR. The operation of FEC is described in Khermosh, US Patent Publication No. 20050005189 (assigned to the assignee of the present invention and henceforth referred to as Khermosh '189), which patent application is incorporated by reference for all purposes as if fully set forth herein. FEC is a coding technique that uses additional (i.e. redundant, or parity-check) symbols as part of a transmission of a digital signal sequence through a physical channel. The symbols are a type of error control codes. But, because of the presence of sufficient redundancy, when errors corrupt the received signal, the receiver not only recognizes the errors, but also corrects the errors without requesting retransmission. In practice, the improvement in the BER achieved through the use of FEC is known as "coding gain."

Adding FEC capability to a legacy Ethernet network may cause errors in the media access control (MAC) layer of the non-FEC-capable (i.e. legacy) network elements. Moreover, applying FEC only to the payloads of data packets would not affect network-link budget constraints because packet headers, which carry destination information and frame boundary fields of the packets, would not benefit from the improved BER of the payloads. On the other hand, applying FEC separately to the headers and payloads can make the headers unrecognizable to the "non-FEC" network elements. These headers should be decoded in a reliable manner to provide line immunity. Furthermore, the headers should be decoded more reliably than the FEC protection so as not to limit network performance.

The method of packet-based FEC is specified in the IEEE 802.3, clause 65. Specific FEC code of Reed Solomon (RS) (255,239,8) code was selected therein, and specific S_FEC and T_FEC delimiters were selected for the line. The delimiters are a sequence of 8-bit/10-bit (8B/10B in 1000BaseX) code symbols. The 8B/1B code is the physical coding sub-layer (PCS) line code of the 1G Ethernet as specified in the IEEE 802.3, clause 36.

It would be desirable to have devices and methods for improving BER for a given network link budget, and conversely, for increasing the network link budget for a given BER, on Ethernet-compatible networks having non-FEC-capable legacy network elements.

SUMMARY OF THE INVENTION

It is the purpose of the present invention to provide devices and methods for shared-medium data-transmission networks, and particularly, using forward error correction (FEC) coding in Ethernet networks, as specified in the IEEE 802.3, clause 65.

For the purpose of clarity, several terms which follow are specifically defined for use within the context of this application. The terms "frame" and "packet" are used interchangeably herein. The term "dataword" is used in this application to refer to an uncoded, 8-bit data segment. The term "codeword" is used in this application to refer to a coded, 10-bit dataword transmitted after passing through the PCS. The term "correlator" is used in this application to refer to an engine that tests for a match or correlation. In the context of this application, a symbol set acts as a delimiter. The term "hamming-distance indicator" is used in this application to refer to an indicator of the hamming distances from a correlation sequence. The term "threshold-compared hamming-distance indicator" is used in this application to refer to the hamming-distance indicator after being compared a hamming-distance threshold. The term "threshold-compared multiple-correlation indicator" is used in this application to refer to the threshold-compared hamming-distance indicator after being compared to a multiple-correlation threshold.

Additional descriptions of coding and decoding schemes may be obtained from Shu Lin & Daniel J. Costello, Jr., *Error Control Coding: Fundamentals and Applications*, Prentice Hall Inc., 1983. The combinatorial notation used in this application for combinations is, for example: $(^{10}_2)$=comb(10, 2)=fact(10)/(fact(10-2)fact(2)), where the factorial, fact(10)= 10×9×8×7×6×5×4×3×2×1.

In accordance with the principles of the present invention, methods are provided for reliable decoding of the special packet delimiters (S_FEC, T_FEC_E, T_FEC_O). As explained below, the reliable decoding is non-trivial as the hamming distance (i.e. the bit distance between two codewords) of the correlators alone are not sufficient enough for the decoding.

Therefore, according to the present invention, there is provided for the first time a method for improving data correlation using a multiple-correlation state-machine, the method including the steps of: (a) pre-processing a data frame having a plurality of symbol sets, wherein each symbol set demarks a respective frame field of the frame, to provide a threshold-compared hamming-distance indicator; (b) comparing the threshold-compared hamming-distance indicator with at least one multiple-correlation threshold to provide a threshold-compared multiple-correlation indicator; and (c) combining the threshold-compared hamming-distance indicator and the threshold-compared multiple-correlation indicator to determine a match/no-match comparison indicative of field of said frame.

Preferably, the step of pre-processing includes the steps of: (i) checking the frame using at least two correlators matched to at least two symbol sets to provide a correlation sequence; (ii) analyzing the correlation sequence to provide a hamming-distance indicator; and (iii) comparing the hamming-distance indicator with a hamming-distance threshold to provide the threshold-compared hamming-distance indicator.

More preferably, each frame includes a first symbol-set field delimiting a beginning of a preamble field of each frame.

More preferably, each frame includes a second symbol-set field delimiting an end a parity-bytes field of each frame.

More preferably, each frame includes a third symbol-set field delimiting an end of each frame.

Most preferably, at least two correlators are based on the second symbol-set field and the third symbol-set field.

Preferably, the method further includes the step of: (d) prior to the step of combining, comparing a BER of the frame to a BER threshold.

Preferably, the step of combining includes forming a logical-AND of the threshold-compared hamming-distance indicator and the threshold-compared multiple-correlation indicator.

Preferably, the data frame is an FEC-protected data frame.

Preferably, the method further includes the step of (d) prior to performing step (c), iterating step (b), wherein the comparing includes comparing each indicator, of a plurality of indicators, with each multiple-correlation threshold to provide a threshold-compared multiple-correlation indicator.

According to the present invention, there is provided for the first time a device configured to operate according to the method described above.

According to the present invention, there is provided for the first time a method for improving data correlation using a weighted-correlation, the method including the steps of: (a) pre-processing a data frame having a plurality of symbol sets, wherein each symbol set demarks a respective frame field of the frame, to provide a threshold-compared hamming-distance indicator; (b) weighting the threshold-compared hamming-distance indicator to provide a weighted hamming-distance indicator according to a parameter set; (c) comparing the weighted hamming-distance indicator with a weighted-correlation threshold to provide a threshold-compared weighted-correlation indicator; and (d) combining the weighted hamming-distance indicator and the threshold-compared weighted-correlation indicator to determine a match/no-match comparison indicative of a field of said frame.

Preferably, the step of pre-processing includes the steps of: (i) checking the frame using at least one correlator matched to at least one symbol set to provide a correlation sequence; (ii) analyzing the correlation sequence to provide a hamming-distance indicator; and (iii) comparing the hamming-distance indicator with a hamming-distance threshold to provide the threshold-compared hamming-distance indicator.

More preferably, each frame includes a first symbol-set field delimiting a beginning of a preamble field of each frame.

More preferably, each frame includes with a second symbol-set field delimiting an end a parity-bytes field of each frame.

More preferably, each frame includes a third symbol-set field delimiting an end of each frame.

Most preferably, at least two correlators are based on the second symbol-set field and the third symbol-set field.

Preferably, the step of weighting is based on bits having respective symbol sets distanced one bit from a correlated delimiter of the respective frame field.

Most preferably, the step of weighting is dependent on a BER of the frame.

Most preferably, the method further includes the step of: (e) prior to the step of combining, comparing a BER of the frame to a BER threshold.

Preferably, the step of combining includes forming a logical-AND of the weighted hamming-distance indicator and the threshold-compared weighted-correlation indicator.

Preferably, the data frame is an FEC-protected data frame.

According to the present invention, there is provided for the first time a device configured to operate according to the method described above.

These and further embodiments will be apparent from the detailed description and examples that follow.

BRIEF DESCRIPTION OF THE DRAWINGS

The present invention is herein described, by way of example only, with reference to the accompanying drawings, wherein:

FIG. 6 is a schematic flowchart of the processing steps in a multiple-correlation method, according to the present invention;

FIG. 7 is a schematic flowchart of the processing steps in the weighted-correlation method, according to the present invention.

DESCRIPTION OF THE PREFERRED EMBODIMENTS

The present invention relates to devices and methods for shared-medium data-transmission networks, and particularly, using forward error correction (FEC) coding in Ethernet networks, as specified in the IEEE802.3, clause 65. The principles and operation for shared-medium data-transmission networks, according to the present invention, may be better understood with reference to the accompanying description and the drawings.

Figure 1:
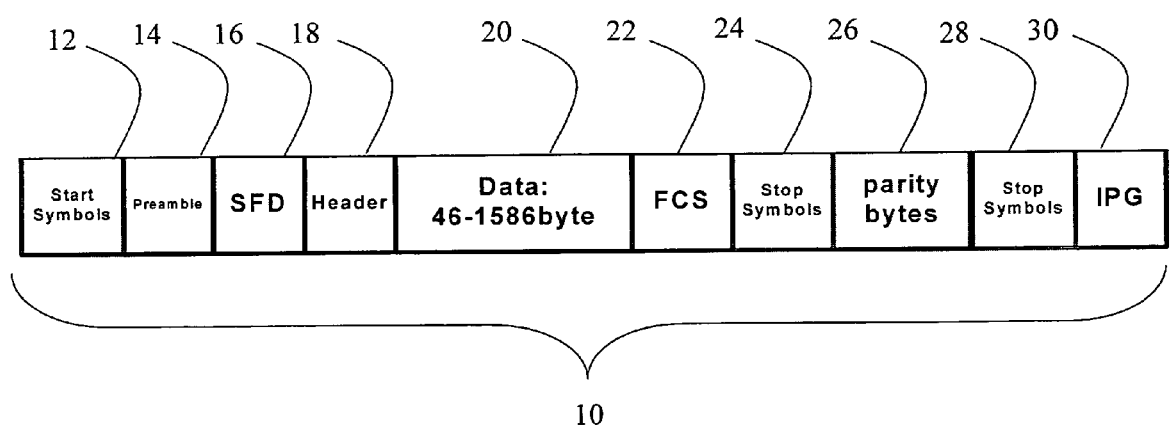
FIG. 1 shows the format of the field blocks of a coded packet frame, according to the present invention.

Referring now to the drawings, FIG. 1 shows the format of the field blocks of a coded packet frame, according to the present invention. A frame 10 is shown having: a start-symbols field 12, signifying the beginning of the packet; a preamble field 14, which serves as a synchronizing sequence to allow the PCS to synchronize with received frame 10 (i.e.

Ethernet packet); a start-frame delimiter (SFD) field 16, which is a special sequence of 10101011, signifying the start of the information-carrying part of frame 10; a header field 18, which combines a destination address of the receiver, a source address of the transmitter, and an indicator of the length/type of a data field 20 of frame 10; data field 20, which is a variable length field of between 46 and 1586 bytes (if necessary, data field 20 is padded with all zeros, so that the length of data field 20 is at least 46 bytes); a frame-check sequence (FCS) field 22, which is a dword (i.e. 4 byte data segment) of frame 10, having a cyclic-redundancy-check value used to verify the integrity of received frame 10; a stop-symbols field 24, which signifies the end of frame 10; a parity-bytes field 26, which has parity-check bytes resulting from encoding of an information block (which can include, for example, preamble field 14, SFD field 16, header field 18, data field 20, and FCS field 22. In preferred embodiments, all five of these fields are block encoded.) in frame 10; a second stop-symbols field 28, similar to stop-symbols field 24, which delimits parity-bytes field 26; and an inter-packet gap (IPG) field 30.

Strictly speaking, the IPG field 30 is not part of frame 10. Rather, IPG field 30 is a time gap, or "buffer zone," between consecutive packets on the network. Nevertheless, because the Ethernet standard specifies handling of IPG field 30, IPG field 30 is included in FIG. 1.

The FEC coding in the present invention operates according to a Reed Solomon (RS) $GF(2^8)$–(255,239,8) code. In such a coding scheme, for every 239 bytes of data, there are 16 parity bytes added to allow the code to correct up to eight bytes with errors. The field polynomial is: $f(x)=x^8+x^4+x^3+X^2+1$, and $\alpha$ is the primitive of the field, generating polynomial:

$$g(x) = \prod_{i=0}^{15} (x - \alpha^i).$$

The actual FEC coding used is a systematic block-coding type. Block coding means coding of blocks of k information source symbols into blocks of code symbols or codewords of n symbols. (A symbol can be a bit, a byte, a 16-bit word, or any other binary or non-binary character or string of characters.) As redundancy implies, n>k. The rate of such code is defined as R=k/n. A systematic block code is a code where the information symbols of a block to be coded are carried into the corresponding codeword, and the parity-check symbols (of parity-bytes field 26) are added to the codeword. Thus, the information symbols remain visible after the block is coded.

Merging the FEC coding with the data information, the additional information is added to the media access control (MAC) layer. Each frame 10 with the length of L bytes is extracted with 2t(L/k) bytes for a constant rate code, R, with a correction length of t, where L is between 71 to 1611, t is equal to 8 and k equal to 239. Frames with length under k bytes (where n, the frame length=239 bytes) are "padded" with zeros (virtually, without sending the zero-bytes). The new packet is coded with 2t (=16) parity bytes added to the frame. The received packet can contain one to seven blocks; where the maximum block size is 239 data bytes plus the 16 parity bytes.

The frame boundaries of frame 10 are not protected by the RS code. Therefore, the frame boundaries are replaced by a stream of symbols which are correlated for protected detection as a way of ensuring detection of the frame boundaries (for a more detailed description of such correlation, see Khermosh '189 and/or the IEEE 802.3 specification, clause 65). The stream of symbols is constructed from 8B/10B codewords.

At the beginning of frame 10, start-symbols field 12 provides the first byte of the packet, which is indicated upon the detection of the S_FEC symbol set (i.e. /K28.5/D6.4/K28.5/D6.4). The symbol set notations and sequences used in this document are defined in the IEEE 802.3 specification (e.g. in chapter 36 of the specification, which describes the PCS). The notations and sequences are known to those skilled in the art. Stop-symbols field 24 provides the last byte of data field 20, which is indicated upon the first detection (i.e. end of stop-symbols field 24) of the T_FEC_O or T_FEC_E symbol sets.

For T_FEC_E with negative disparity, the symbol set is T/R/K28.5/D10.1/T/R. For T_FEC_E with positive disparity, the symbol set is T/R/K28.5/D29.5/T/R. For T_FEC_O, the symbol set is T/R/R/I/T/R. At the end of frame 10, stop-symbols field 28 provides the last byte of the parity-bytes field 26, which is indicated upon the detection of the T_FEC_E symbol set. Networks with non-FEC-capable legacy network elements do not cause errors as explained in detailed in Khermosh '189.

An analysis of the correlation scheme was performed. The following assumptions, which are the characteristics of the code and are deduced from the 8B/10B codeword tables, were made in the correlator analysis:
(a) the distance of T from a data word is one bit;
(b) the distance of K28.5 from a data word is one bit;
(c) the distance of R from a data word is one bit;
(d) the distance of T from R is two bits; and
(e) the distance of K28.7 from any codeword is at least two bits and one bit from K28.5 (and K28.1).

The correlation scheme counts errors in all positions. In scenarios in which the positions are specified, the probability of error is reduced.

The current correlator performance, for the T_FEC_O symbol set (i.e. T/R/R/K28.5/D/T/R) and the T_FEC_E symbol set (i.e. T/R/K28.5/D/T/R), results in:
(a) a worst-case distance from a random data-stream of five,
(b) a three-error limit will cause misdetection; and
(c) the probability of error is $\binom{60}{3} \times (10^{-4})^3 = 3.4 \times 10^{-8}$;
(d) for the S_FEC symbol set, error does not arise in the analysis because the scheme is not searching for S_FEC symbol set until parity-bytes field 26 ends;
(e) for a distance of the T_FEC_E symbol set (i.e. T/R/K28.5/D/T/R) from a shifted word which ends at the end of a frame (e.g. D/D/D and /D/T/R) of three:
  (i) a two-error limit will cause misdetection;
  (ii) the probability of error is $\binom{60}{2} \times (10^{-4})^2 = 1.5 \times 10^{-6}$.

The present invention includes two principal method of correlation: a double-correlation state-machine method and a weighted-correlation method. The double-correlation state-machine method keeps the same correlators as described in the analysis above. The problem in T_FEC detection is solved by enhancing the detection criteria. Instead of checking for a single occurrence of correlation match, two occurrences of the T_FEC correlator are verified.

The data is not processed off-line because a positive identification of the start of the packet is made only at the second T_FEC symbol set. Thus, the FEC decoding machine (i.e. state machine) must know the parity-bytes location in real-time. Therefore, a buffer is used for that handle the real-time processing demand. The minimal size of the buffer is: (number of parity bytes)+2(T_FEC length), or (7×16)+12=124 bytes. Typically, a 128-byte data buffer is used. The buffer is typically implemented with a fixed delay, but can also be implemented with a variable delay (i.e. "first-in-first-out" or FIFO).

The state machine is modified to detect only the T_FEC symbol set at the end of parity-bytes field 26. Only the T_FEC_E symbol set can arrive after the parity bytes, therefore, only the T_FEC_E symbol set is detected. A few more data words are checked following T_FEC symbol set; otherwise, the second T_FEC symbol set can be mistaken as the first T_FEC symbol set. The state machine checks for additional "idle-points" after the correlator, each idle-point adds a two-bit distance. For determining the number of additional idle-points to search for, as in other correlator selection, two criteria are checked: (1) distance from random data, and (2) distance from idle-points.

The end of parity-bytes field 26 provides deterministic knowledge of the packet length. The length of the packet is the total length minus the correlator length minus the number of predicted parity bytes. A shadow counter is used to count the actual data length, based on the formulation of the length. However, since the number of bytes can be even or odd, it is necessary to determine the correct number of bytes via a secondary method that confirms the shadow counter.

To determine the correct number of bytes, the T_FEC symbol set at the end of each packet is checked whether the symbol set is odd or even (i.e. T_FEC_O or T_FEC_E, respectively) by selecting the value with the lower distance. The value is stored, and added to the frame as an indication of the distance, enabling the correct length to be determined. The end of frame signal (i.e. stop-symbols field 28), and other control signals such as parity-bytes field 26, are created by the buffer control. The probability of misdetection for two idle-points is $(^{160}_{5})(10^{-4})^5 = 8 \times 10^{-12}$, and the probability of misdetection for three idle-points is $(^{180}_{6})(10^{-4})^6 = 4 \times 10^{-14}$.

Figure 2:
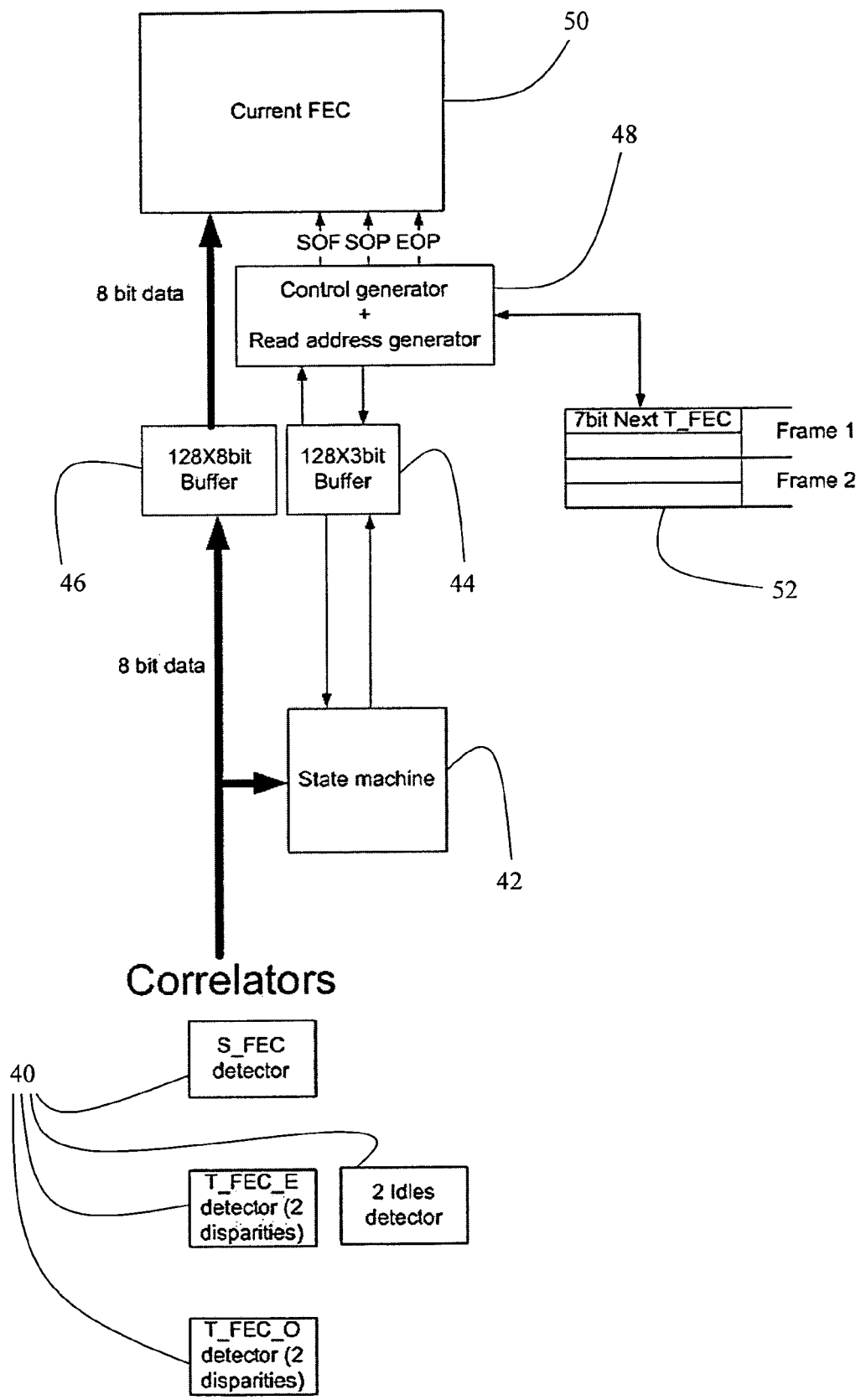
FIG. 2 is a simplified schematic block diagram of the data flow in a correlator state machine, according to the present invention.

FIG. 2 is a simplified schematic block diagram of the data flow in a correlator state machine, according to the present invention. FIG. 2 shows the correlation scheme described above. Correlators 40 include an S_FEC detector, a T_FEC_E 2-disparity detector and a T_FEC_O 2-disparity detector, and a 2-idle-point detector. A state machine 42 always forwards the data to a 128×3-bit buffer 44. The uncoded 8-bit data is also sent to a 128×8-bit buffer 46. From buffer 44, the data is sent to a control & read-address generator 48, and then to an FEC 50 (where SOF, SOP, and EOP stand for start-of-frame, start-of-parity, and end-of-parity, respectively). A 7-bit next T_FEC 52 serves to hold the positions of the T_FEC symbol sets in the FIFO when the symbol sets are matched in the "data_state" (listed below) for the T_FEC symbol set on-line, so that when the final T_FEC O symbol set arrives, the value held in next T_FEC 52 is the former T_FEC symbol set, which indicates the end of the data-frame position. Seven bits (i.e. $\log_2(128)$) are needed to provide the place for the 128-byte FIFO. Two values are held for the match of the T_FEC_O symbol set and the T_FEC_E symbol set. Another symbol set is held for the next short packet, which can arrive while the current packet is being processed (i.e. sending the parity bytes out).

The various states and state instruction-sets of state machine 42 are defined as follows:

Idle_state:

waiting for S_FEC detection; (1)

if S_FEC detected; (2)

then go to Start_state; (3)

Start_state:

SOP bit=1; (4)

go to Data_state; (5)

length=0;block=1; (6)

block_length=0; (7)

Data_state: (increment distance)

length=length+1; (8)

block_length=block_length+1; (9)

if block_length>(239+16); (10)

then block_length=0; and (11)

block=block+1; (12)

check for T_FEC_E and T_FEC_O; (13)

put the minimal distance in the buffer according to whether the match is even or odd; (14)

check for 2 idle-points; (15)

if the minimal distance corresponds to T_FEC_E and idle-points≦4; (16)

then go to Temp_end_state; (17)

Temp_end_state: (defined not to consume clock cycle)

old_check=read (FIFO_status of current place)−16*(block)+6; (18)

if (the minimal distance of old_check)+(current minimal distance)≦4; (19)

then go to End_state; (20)

else go to Data_state; (21)

End_state:

SOP of FIFO_data (16*(block)+6+even/odd)=1; (22)

EOP=1; (23)

go to Idle_state. (24)

The weighted-correlation method keeps the same correlators as described in the analysis above. The method involves different weighting of errors in bit-positions where the near legal codewords are closer in hamming distance. The legal codewords, which are neighbors of the received codeword, are distanced from the received codeword differently. There are specific positions for which the codewords are closer and the probability of a single error in such positions can cause an error in the word detection. If a single error, which occurs at one of these positions is specifically checked and not in every bit in the sequence, then the $(^{60}_{4})$ factor is reduced, since only four specific positions are checked, not every combination out of the 60 bits.

The positions are checked by weighting the position bit errors and checking for larger hamming distances. Weighting is performed once at a symbol to indicate single-error weighting. Higher hamming distances are assigned to specific bit errors. For example, at the first −T symbol, when there is a single error in bits 4, 8, and 9 (i.e. a legal codeword is found in a bit difference of bit 4 or bit 8 or bit 9), a weighting distance of two bits is assigned for this error. At the second −R symbol, when there is a single error in bits 8 and 9 (i.e. a legal codeword is found in a bit difference of bit 8 or bit 9), a weighting distance of two bits is assigned for this error. A preferred embodiment of the present invention allows a single bit error in the first −T symbol with an additional check of the disparity of the correlator, assuming that the codeword erroneously having the T symbol arrives from the same disparity correlator for T symbol and that the codeword is verified.

Within the weighted-correlation method, there are two parameters that affect performance: false detection and misdetection, False detection utilizes random data detection as a good correlator. Misdetection results in a good correlator being missed due to errors. There is tradeoff between the two parameters of improving one occurs typically at the "expense" of degrading the other. The weighted-correlation method can be embodied in a device similar to the correlator state machine of FIG. 2.

Another novel feature of the weighted-correlation method is that the method defines different decision threshold based on the detected errors. For achieving <$10^{-12}$ random data protection, at least three errors are needed to occur in the data stream before declaring a "pass" state. For achieving <$10^{-12}$ misdetection protection, at least three errors are needed to occur in the data stream before declaring a "fail" state.

Therefore, the maximum hamming distance for weighted two-bit errors is eight because it is undesirable if two errors, in which each error is weighted by two bits, will cause misdetection. Such a situation arises in the case of weight of five bits, in which each error is weighted by two bits. In such a case, two error bits occur. For other errors, the hamming distance can be smaller than six because three errors can cause misdetection. In order to improve performance, errors in the last two symbols would decrease the threshold because those symbols allow distances of two to other valid symbols.

Weighting specific error positions can increase the performance of the correlator for misdetection, thereby reducing the ($^{60}_{4}$) component. The enhancement in performance, as mentioned above, is due to the fact that a single error can occur in the 10-bit symbols only at specific positions for valid codewords. If a single error at such a position is specifically checked, then the ($^{60}_{4}$) component is reduced, since four specific positions are checked.

The justification for such an approach is that the probability of a single error is much higher than all combinations of possible double errors. This assumption is not valid when the BER is high. When the BER is low, then the weight can be increased. For a BER of $10^{-4}$, a weight of two is adequate (i.e. $10^{-4}$ compared to ($^{10}_{2}$)*$10^{-8}$). Since the hamming distance is six and there are 1800 codewords distanced in six bits, the weighting will not reduce all combinations. Only single-error combinations can be reduced, which leaves some "error factor" for the double-error case.

As an example for the T_FEC_O symbol set (i.e. T/R/R/K28.5/D/T/R) and T_FEC_E symbol set (i.e. T/R/K28.5/D/T/R), which refer to the specific correlators of the IEEE802.3 clause 65 FEC correlators, an analysis is presented on T_FEC_E with negative disparity. The same approach is applied for the rest of the correlators (e.g. −T_FEC_E=−T/−R/−K28.5/+D29.5/−T/−R−). Disparity ruling of the false detection symbol reduces the resulting table to the following relevant sequences:

+T_FEC_E+T/+R/+K28.5/−D10.1/−T/−R−; (1)

−T_FEC_O=−T/−R/−R/−K28.5/+D16.2/−T/−R−; and (2)

+T_FEC_O+T/+R/+R/+K28.5/−D5.6/−T/−R−). (3)

Table 1 shows the single-bit-error codewords for the indicated symbols.

TABLE 1

Single-bit-error codewords for the indicated symbols.

| −T | −R | −K28.5 | +T | +R | +K28.5 |
|---|---|---|---|---|---|
| −, D29.1, +bit 9 | −, D23.1, +bit 9 | −, D12.5, −bit 4 | +, D29.6, −bit 9 | +, D23.6, −bit 9 | −, D19.2, −bit 4 |
| −, D29.5, +bit 8 | −, D23.5, +bit 8 | −, D20.5, −bit 3 | +, D29.2, −bit 8 | +, D23.2, −bit 8 | −, D11.2, −bit 3 |
| +, D13.7, −bit 4 | | −, D28.5, −bit 5 | −, D18.7, +bit 4 | | −, D3.2, −bit 5 |
| | | +, D7.5, +bit 2 | | | −, D7.2, −bit 2 |
| | | +, D12.5, +bit 4 | | | +, D19.2, +bit 4 |
| | | +, D20.5, +bit 3 | | | +, D11.2, +bit 3 |
| | | +, D28.5, +bit 5 | | | +, D3.2, +bit 5 |

The following correlation check is relevant for five distant codewords in which two errors are allowed and three errors cause a misdetection. The decoder counts the errors in the correlator sequence. At the first −T symbol having an error in bits 4, 8, and 9, a weighting of two bits is assigned to an error in these positions. At the second −R symbol having an error in bits 8 and 9, a weighting of two bits is assigned to an error at these positions. The process is applied to the other symbols in a similar fashion.

In the highest probability case, for a single error having a hamming distance of less than six, the probability of misdetection is less than $3 \times 2 \times 4 \times (10^{-4})^3 = 2.4 \times 10^{-11}$. In the case of six allowable errors, the total error is composed of single errors plus one double-error. This case applies for configurations in which three errors are allowed and four errors cause a misdetection. Single errors are weighted by two. The hamming distance is less than eight if all of the errors are single error in the weighted bits. The hamming distance is less than six if there is an error in the non-weighted bits of the last two symbols. The probability of misdetection is less than:

$$(3 \times 4 \times 3 \times 2 + 1 \times 4 \times 3 \times 2 + 1 \times 3 \times 3 \times 2 + 1 \times 3 \times 4 \times 2 + 1 \times 3 \times 4 \times 3 + (^{10}_{2}) \times (1 \times 3 + 1 \times 4 + 1 \times 3 + 1 \times 2 + 2 \times 4 + 3 \times 3 + 3 \times 2 + 4 \times 3 + 4 \times 2 + 3 \times 2)) \times (10^{-4})^4 = 2.9 \times 10^{-13}.$$

Figure 3:
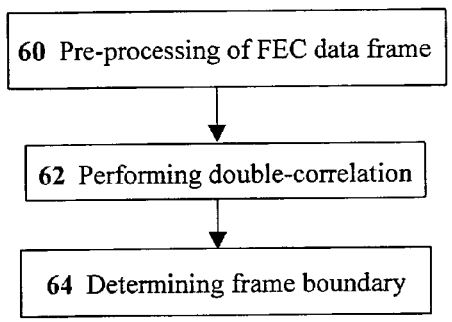
FIG. 3 is a high-level flowchart of the processing steps in the double-correlation method, according to the present invention.
Figure 4:
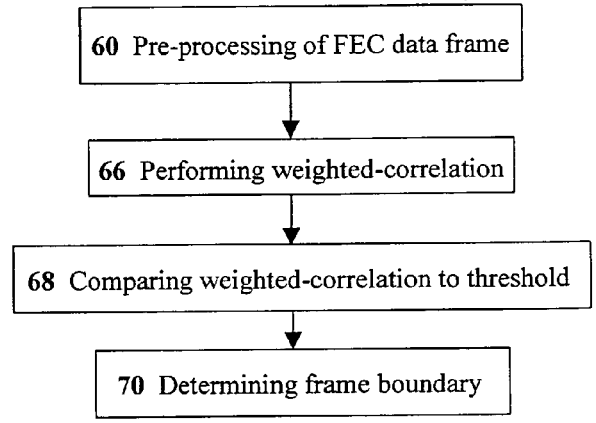
FIG. 4 is a high-level flowchart of the processing steps in the weighted-correlation method, according to the present invention.
Figure 5:
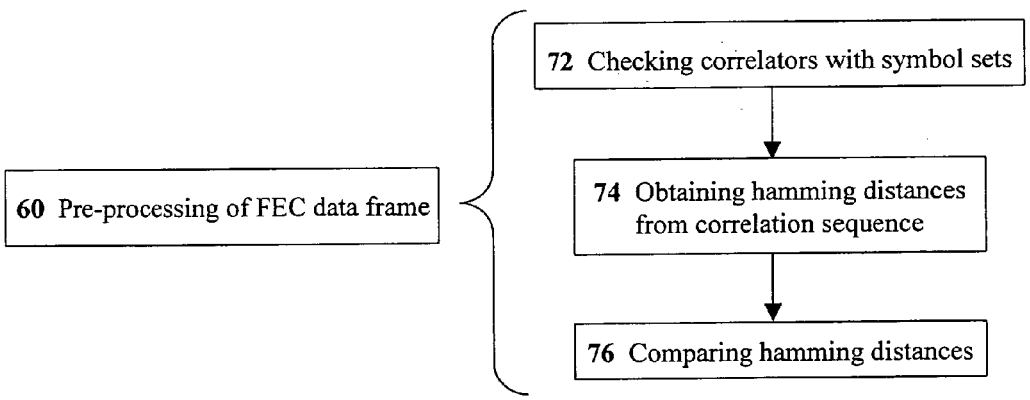
FIG. 5 is a high-level flowchart of typical pre-processing steps in prior-art methods.

A schematic overview of the methods are shown in FIGS. 3-7. FIG. 3 is a high-level flowchart of the processing steps in the double-correlation method, according to the present invention. After pre-processing of the FEC data frame has been done (Step 60), the double-correlation is performed (Step 62) and the frame boundary determined (Step 64). FIG. 4 is a high-level flowchart of the processing steps in the weighted-correlation method, according to the present invention. After pre-processing of the FEC data frame has been done (Step 60), the weighted-correlation is performed (Step 66), the weighted correlation is compared to the threshold (Step 68), and the frame boundary determined (Step 70). FIG. 5 is a high-level flowchart of typical pre-processing steps in prior-art methods. The pre-processing of the frame (Step 60 in FIGS. 3 and 4) typically includes checking correlators with symbol sets (Step 72), obtaining hamming distances from a correlation sequence (Step 74), and comparing the hamming distances (Step 76), for example.

FIG. 6 is a schematic flowchart of the processing steps in a multiple-correlation method, according to the present invention. FIG. 6 shows the processing steps in greater detail. After the first correlator has been checked for a match and the hamming distance has been calculated (Step 80), the $2^{nd}$ through the $N^{th}$ correlators are checked for a match and the hamming distance are calculated (Step 82). Step 82 refers to the more general case of multiple-correlation. For the double-correlation method described above, the process continues after the second correlator is checked. The first threshold is then checked for a match (Step 84). If there is no match, the correlators are checked again (Step 80). If there is a match, the $2^{nd}$ through $N^{th}$ thresholds are then checked for a match (Step 86). If there is no match, the correlators are checked again (Step 80). If there is a match, a decision is made on the correlation of the frame (e.g. start_of_packet, end_of_packet, end_of_parity) (Step 88).

FIG. 7 is a schematic flowchart of the processing steps in the weighted-correlation method, according to the present invention. FIG. 7 shows the processing steps in greater detail. After the correlator has been checked for a match and the hamming distance has been calculated (Step 90), the hamming distance is weighted according to a parameter set (Step 92). Based on the parameter set, the hamming distance may or may not be weighted. If the hamming distance is not weighted, the first threshold is checked for a match (Step 94). If there is no match, the correlator is checked again (Step 90). If there is a match, a decision is made on the correlation of the frame (e.g. start_of_packet, end_of_packet, end_of_parity) (Step 100). If the hamming distance is weighted, the $2^{nd}$ through $N^{th}$ thresholds are checked for a match (Step 96). Step 96 utilizes the weighted correlation, and refers to the more general case of multiple weighting. If there is no match, the correlator is checked again (Step 90). If there is a match, the weighted correlation is compared (Step 98), and a decision is made on the correlation of the frame (e.g. start_of_packet, end_of_packet, end_of_parity) (Step 100). It is noted that the weighting correlation method can be generalized to include multiple thresholds by iterating Step 96.

In other preferred embodiments of the present invention, both the double-correlation state-machine method and the weighted-correlation method can include the option of performing the correction with an additional decoding of the FEC code in order to check if the number of errors is high. In such embodiments, the FEC BER is compared, in addition to the weighting or state-machine check, to an FEC BER threshold. In such a scenario, the correlators are protected by the FEC code, and additional protection for the correlator detection is provided. Furthermore, it is noted that the double-correlation method can be extended to a multiple-correlation method by following the scheme detailed above with additional correlation between correlators and symbol sets.

It is appreciated that the weighted-correlation method described above is not limited to the parameter sets mentioned, used as examples, for weighting hamming-distance indicators. Such alternate parameter sets can be based on, for example, on-line metrics or a priori knowledge of previous symbol sets.

While the invention has been described with respect to a limited number of embodiments, it will be appreciated that many variations, modifications, and other applications of the invention may be made.

What is claimed is:

1. A method of reducing errors in data received from a data transmission network comprising the steps of:
   (a) receiving from the data transmission network a variable length data frame having a received bit error rate (BER) and having a plurality of symbol sets, wherein each of said symbol sets demarks a respective field of said variable length data frame;
   (b) storing said variable length data frame in a first buffer;
   (c) providing a plurality of correlators, each of said plurality of correlators for calculating a respective Hamming distance;
   (d) processing each of said symbol sets with at least one of said plurality of correlators to calculate respective Hamming-distances;
   (e) providing a plurality of thresholds;
   (f) calculating, using said respective Hamming-distances with a respective one of said plurality of thresholds, a plurality of threshold-compared Hamming-distance indicators;
   (g) providing at least one multiple-correlation threshold;
   (h) determining, using said plurality of threshold-compared Hamming-distance indicators with said at least one multiple-correlation threshold, a correlation decision indicator indicating the correlation of at least one of said plurality of symbol sets to said respective field of said variable length data frame;
   (i) storing said correlation decision indicator in a second buffer; and
   processing said variable length data frame from said first buffer in a forward error correction (FEC) processing module according to said correlation decision indicator from said second buffer, thereby providing received data having an improved bit error rate (BER).

2. The method of claim 1, wherein said variable length data frame includes a first symbol-set delimiting a beginning of a preamble field of said variable length data frames.

3. The method of claim 2, wherein said variable length data frame includes a second symbol-set delimiting an end parity-bytes field of said variable length data frames.

4. The method of claim 3, wherein said variable length data frame includes a third symbol-set delimiting an end of said variable length data frames.

5. The method of claim 4, wherein a first correlator of said plurality of correlators is based on said second symbol-set and a second of correlator of said plurality of correlators is based on said third symbol-set.

6. The method of claim 1 wherein at least one of said plurality of correlators uses a bit error rate (BER) threshold, said BER threshold depending on the BER of the processed variable length data frame.

7. The method of claim 1 wherein said step of determining further includes calculating a threshold-compared multiple-correlation indicator using at least one of said plurality of threshold-compared Hamming-distance indicators with said at least one multiple-correlation threshold, and then performing a logical-AND of said at least one of said plurality of threshold-compared Hamming-distance indicators and said threshold-compared multiple-correlation indicator to determine a correlation of at least one of said plurality of symbol sets to said respective field of said variable length data frame.

8. The method of claim 1 wherein said variable length data frame is an FEC-protected data frame.

9. The method of claim 1 wherein said step of determining further includes using said plurality of threshold-compared Hamming-distance indicators with a plurality of the given multiple-correlation thresholds, to determine a correlation of at least one of said plurality of symbol sets to said respective field of said variable length data frame.

10. The method of claim 1 further comprising the step of determining the length of said variable length data frame.

11. A method of reducing errors in data received from a data transmission network, comprising the steps of:
   (a) receiving from the data transmission network a variable length data frame having a received bit error rate (BER) and having a plurality of symbol sets, wherein each of said symbol set demarks a respective field of said variable length data frame;
   (b) storing said variable length data frame in a first buffer;

(c) providing at least one correlator for calculating a weighted-correlation indicator, wherein each said at least one correlator at least in part weights a Hamming distance based on bit-positions according to at least one given parameter set;

(d) processing each of said symbol sets with one of said at least one correlators to calculate respective weighted-correlation indicators;

(e) providing at least one threshold;

(f) calculating, using said weighted-correlation indicators with said at least one threshold, at least one threshold-compared Hamming-distance indicator;

(g) providing at least one weighted-correlation threshold;

(h) determining, using said at least one threshold-compared Hamming-distance indicator with said at least one weighted-correlation threshold, a correlation decision indicator indicating a correlation of at least one of said plurality of symbol sets to said respective field of said variable length data frame;

(i) storing said correlation decision indicator in a second buffer; and (j) processing said variable length data frame from said first buffer in a forward error correction (FEC) processing module according to said correlation decision indicator from said second buffer, thereby providing received data having an improved bit error rate (BER).

12. The method of claim 11, wherein said variable length data frame includes a first symbol-set delimiting a beginning of a preamble field of said variable length data frames.

13. The method of claim 12, wherein said variable length data frame includes a second symbol-set delimiting an end a parity-bytes field of said variable length data frames.

14. The method of claim 13, wherein said variable length data frame includes a third symbol-set delimiting an end of said variable length data frames.

15. The method of claim 14, wherein a first correlator of said at least one correlator is based on said second symbol-set and a second correlator of said at least one correlator is based on said third symbol-set.

16. The method of claim 11, wherein at least one of said given parameter sets is based on one bit distances from a given correlated delimiter of said frame field.

17. The method of claim 11, wherein at least one of said given parameter sets is based on the BER of the processed variable length, data frame.

18. The method of claim 11 wherein said at least one correlator uses a bit error rate (BER) threshold, said BER threshold depending on the BER of the processed variable length data frame.

19. The method of claim 11, wherein said step of determining further includes calculating a threshold-compared multiple-correlation indicator using at least one of said threshold-compared Hamming-distance indicators with at least one said weighted-correlation threshold, and then performing a logical-AND of said at least one of said threshold-compared Hamming-distance indicators and said threshold-compared multiple-correlation indicator to determine the correlation of at least one of said plurality of symbol sets to said respective field of said variable length data frame.

20. The method of claim 11, wherein said data frame is an FEC-protected data frame.

21. The method of claim 11 further comprising the step of determining a length of said variable length data frame.

22. A system for receiving data from a data transmission network, comprising:

(a) a first buffer operationally connected to the data transmission network, said first buffer configured to store a variable length data frame received from the data transmission network, said variable length data frame having a received bit error rate (BER) and having a plurality of symbol sets, wherein each of said symbol sets demarks a respective field of said variable length data frame;

(b) a processing system including at least one processor, said processing system configured to:
 (i) process each of said symbol sets with at least one of a plurality of correlators to calculate respective Hamming-distances;
 (ii) calculate, using said respective Hamming-distances with one of a plurality of thresholds, a plurality of threshold-compared Hamming-distance indicators; and
 (iii) determine, using said plurality of threshold-compared Hamming-distance indicators with at least one multiple-correlation threshold, a correlation decision indicator indicating a correlation of at least one of said plurality of symbol sets to said respective field of said variable length data frame;

(c) a second buffer configured to store said correlation decision indicator; and (d) a forward error correction (FEC) processing module configured to process said variable length data frame from said first buffer according to said correlation decision indicator from said second buffer, thereby providing received data having an improved bit error rate (BER).

23. A system for receiving data from a data transmission network, comprising:

(a) a first buffer operationally connected to the data transmission network, said first buffer configured to store a variable length data frame received from the data transmission network, said variable length data frame having a received bit error rate (BER) and having a plurality of symbol sets, wherein each of said symbol sets demarks a respective field of said variable length data frame;

(b) a processing system including at least one processor, said processing system configured to:
 (i) process each of said symbol sets with a correlator to calculate a respective weighted-correlation indicator, wherein said correlator is from a set of at least one correlators, and wherein each said correlator at least in part weights a Hamming distance based on bit-positions according to at least one given parameter set;
 (ii) calculate, using said weighted-correlation indicators with at least one threshold, at least one threshold-compared Hamming-distance indicator; and
 (iii) determine, using said at least one threshold-compared Hamming-distance indicator with at least one weighted-correlation threshold, a correlation decision indicator indicating the correlation of at least one of said plurality of symbol sets to said respective field of said variable length data frame;

(c) a second buffer configured to store said correlation decision indicator; and (d) a forward error correction (FEC) processing module configured to process said variable length data frame from said first buffer according to said correlation decision indicator from said second buffer, thereby providing received data having an improved bit error rate (BER).

* * * * *

UNITED STATES PATENT AND TRADEMARK OFFICE
CERTIFICATE OF CORRECTION

| | | |
|---|---|---|
| PATENT NO. | : 7,890,840 B2 | |
| APPLICATION NO. | : 11/593585 | |
| DATED | : February 15, 2011 | |
| INVENTOR(S) | : Lior Khermosh et al. | |

It is certified that error appears in the above-identified patent and that said Letters Patent is hereby corrected as shown below:

Column 12, line 18: should be corrected as follows:

Insert --(j)-- at the beginning of the line before "processing said variable length data frame..."

Signed and Sealed this
Seventeenth Day of May, 2011

David J. Kappos
*Director of the United States Patent and Trademark Office*